US012216774B2

(12) United States Patent
Kaidi et al.

(10) Patent No.: US 12,216,774 B2
(45) Date of Patent: Feb. 4, 2025

(54) DYNAMIC AND MODULAR DATA CLASSIFICATION ENGINE

(71) Applicant: PAYPAL, INC., San Jose, CA (US)

(72) Inventors: George Chen Kaidi, Singapore (SG); Li Hua Lim, Singapore (SG); Rajasekaran Radhakrishnan, Chennai (IN); Sreeram Vasudevan, Singapore (SG)

(73) Assignee: PAYPAL, INC., San Jose, CA (US)

( * ) Notice: Subject to any disclaimer, the term of this patent is extended or adjusted under 35 U.S.C. 154(b) by 113 days.

(21) Appl. No.: 18/153,137

(22) Filed: Jan. 11, 2023

(65) Prior Publication Data

US 2024/0176902 A1 May 30, 2024

(30) Foreign Application Priority Data

Nov. 30, 2022 (IN) .............................. 202241069070

(51) Int. Cl.
*G06F 21/62* (2013.01)
*G06F 21/60* (2013.01)

(52) U.S. Cl.
CPC ........ *G06F 21/604* (2013.01); *G06F 21/6209* (2013.01)

(58) Field of Classification Search
CPC .................. G06F 21/604; G06F 21/62; G06F 21/6209–6281
See application file for complete search history.

(56) References Cited

U.S. PATENT DOCUMENTS

| 8,141,127 B1* | 3/2012 | Mustafa | G06F 21/552 726/1 |
| 2005/0138109 A1* | 6/2005 | Redlich | G06F 21/6272 709/201 |
| 2015/0052616 A1* | 2/2015 | Hutchison | G06F 3/0632 726/27 |
| 2020/0145386 A1* | 5/2020 | Chulsky | H04L 43/0817 |

\* cited by examiner

*Primary Examiner* — Kevin Bechtel

(74) *Attorney, Agent, or Firm* — Haynes and Boone, LLP

(57) ABSTRACT

Methods and systems are presented for providing a data control framework that enables storing, sharing, and transferring of data in a secure manner. Data files stored in data repositories are scanned. Content associated with different section of each data file is analyzed, and each section is tagged with a sensitivity level based on the content and a subject matter derived for the data file. Each data file is also assigned to a clearance classification based on an expected viewer of the data file. When sections from a first data file is being transferred to a second data file, a data control mechanism is triggered. If a particular section from the first data file is incompatible with the second data file, the data control mechanism may prevent the particular section from being transferred to the second data file, while allowing the remaining sections being transferred to the second data file.

20 Claims, 8 Drawing Sheets

DYNAMIC AND MODULAR DATA CLASSIFICATION ENGINE

CROSS REFERENCE TO RELATED APPLICATION

The present invention claims the benefit of India Provisional Patent Application No. 202241069070, filed Nov. 30, 2022, which is incorporated herein by reference in its entirety.

BACKGROUND

The present specification generally relates to data classification and access control, and more specifically, to provide enhanced data classification access control functionalities based on modular and dynamic classification of data according to various embodiments of the disclosure.

RELATED ART

Data control has always been a challenging problem for many organizations. The problem is exacerbated in today's electronic world, where electronic data can be transferred, copied, or modified easily. As a result, organizations have to be vigilant in controlling access to different data to avoid misappropriation of certain sensitive/confidential data (as defined herein as data that either a user associate with the data or an entity processing or using the data classifies or otherwise deems as data that should not be publicly accessible). In order to avoid misappropriation of data (e.g., unauthorized access of certain data, etc.), the organization may label different documents with different classifications according to how sensitive the data included in the documents is to the organization. For example, a document that includes highly sensitive materials to the organization may be assigned (or labeled) with a classification such that only a limited number of personnel associated with the organization can access it. On the other hand, a document that includes only public information may be assigned (or labeled) with another classification such that the document can be freely accessed and/or shared with anyone internal or external to the organization. Such a classification system ensures that only designated sensitive information is restricted to authorized personnel without overly limiting sharing of other types of information.

However, there are several drawbacks to such a document classification process. For example, documents are often mislabeled, especially when they are labeled manually by human users. When a document is mislabeled, the organization risks revealing confidential data to unauthorized persons or unnecessarily restricted flow of important information among its workers. In another example, when multiple copies of the same document exist in the data repositories of the organization (e.g., the document being copied and saved in different databases associated with different departments of the organization), different copies of the document may be labeled differently, which may cause confusion when someone wishes to share the document with others, and potentially risks revealing confidential information or creating friction in sharing important information with others. Thus, there is a need for providing a mechanism that enables efficient access control and sharing of data.

Figure 1:
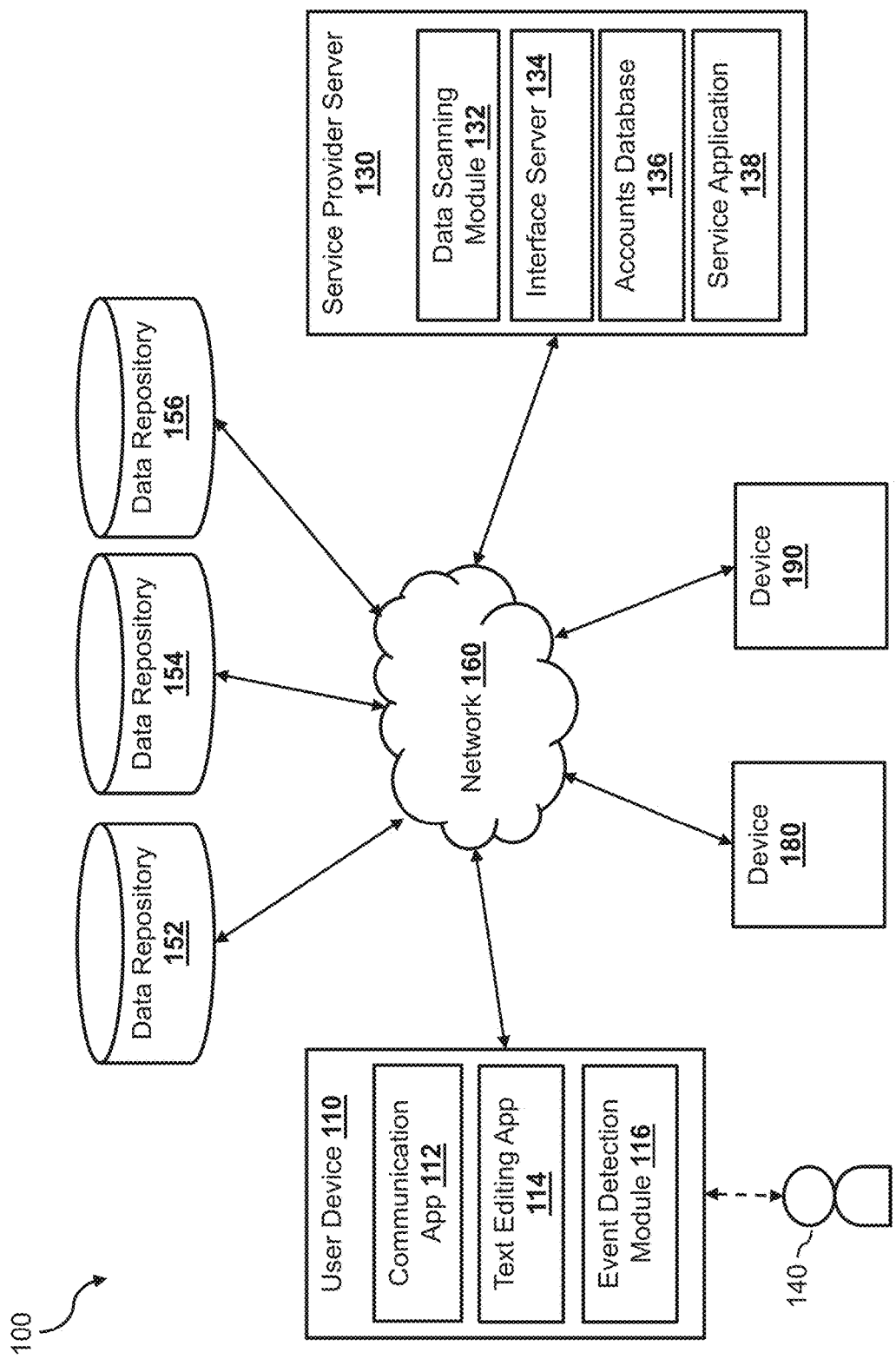
FIG. 1 is a block diagram illustrating a networked system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for providing a data control framework and for using the same that enables storing, sharing, and transferring of data in a secure manner. As discussed herein, two of the common problems arising out of data management is mislabeling of data and inconsistent labeling of multiple copies of the same data. Conventionally, organizations rely on document creators (e.g., persons or systems who created the respective documents) to provide accurate classifications to the documents. However, relying on humans or conventional computing systems to classify data can be error prone. Furthermore, when documents are duplicated and/or when documents are generated based on information from different source documents, the newly generated documents can be easily mislabeled.

As such, according to various embodiments of the disclosure, a data scanning system may provide automatic enhanced classifications and dynamic access control of content associated with an organization. The data scanning system may scan data files stored in one or more data repositories associated with an organization, and automatically classify the data files based on the content of the data file. The data files stored in the one or more data repositories can be of different file types. For example, a data file can be a text document, an image document, or a multimedia file. For example, the data scanning system may access the one or more data repositories, and may scan the data files stored in the one or more data repositories. When scanning a data file, the data scanning system may analyze the content of the data file (e.g., parsing the text included in a text document, analyzing image data/audio data within the multimedia file, etc.) to determine if the data file contains any sensitive and/or confidential information and the sensitivity levels of the information. The data scanning system may classify the data file based on the sensitivity levels of the information included in the data file. For example, if the data scanning system determines that highly sensitive data (e.g., passwords of different users, financial account information, encryption keys, etc. or other data designated by the user or the system) is included in the data file, the data scanning system may assign a higher clearance classification (e.g., Level 1, etc.) to the data file. On the other hand, if the data scanning system determines that the data file includes publicly available data, the data scanning system may assign a lower clearance classification (e.g., Level 5, etc.) to the data file.

Since sensitive data can come in different forms, and may share similarities with (e.g., look like) non-sensitive data (or less sensitive data), the data scanning system of some embodiments may first derive a subject matter (e.g., a topic) of the data file and use the subject matter to assist with the determination of whether a particular piece of data in the data file corresponds to sensitive data (e.g., whether a sequence of 9-digit number corresponds to a social security number, whether a sequence of 16-digit number corresponds to a credit card number, etc.). To derive the subject matter of the data file, the data scanning system of some embodiments may first select one or more sections (but not necessarily all sections) in the data file (e.g., an opening paragraph and a closing paragraph in a text article, the first few minutes and the last few minutes from an audio/video clip, etc.). The data scanning system may analyze the information (e.g., parsing the text, analyzing the words spoken and/or images included in the video clip, etc.) in the one or more sections, and derive a subject matter based on the information contained in the one or more sections of the data file. In some embodiments, the data scanning system may use a natural language processor to derive the subject matter based on the information contained in the one or more sections of the data file.

In some embodiments, the data scanning system may use the subject matter of the data file in addition to the content of the data file to classify the data file. For example, the data scanning system may provide the subject matter derived for the data file and the content (e.g., text, images, video, etc.) as input data to a machine learning model that is configured to predict whether the content includes any sensitive data of the organization. The subject matter of the data file may assist the machine learning model in predicting whether each piece of content in the data file contains sensitive information. For example, the machine learning model is more likely to classify a group of 16-digit number as a credit card number (thus, determining that the data file includes sensitive data) when it is determined that the data file is about funding sources used by users of the organization, as opposed to about dimensions of buildings associated with the organization. The data scanning system may then classify the data file based on an output of the machine learning model.

Since the data file may include sensitive content throughout the data file (e.g., sensitive content only appears in certain section(s), but not all sections of the data file), and different sections of the data file may include content of different sensitivities, it is advantageous for different sections within a data file to be classified independently from each other. As such, in some embodiments, the data scanning system may perform modular classification of data within a data file. Instead of assigning a single sensitivity label to the entire data file, the data scanning system may independently classify different sections of the data file based on the content included within the different sections. For example, the data scanning system may divide the data file into multiple sections, where each section may correspond to a distinct portion of the data file (e.g., different paragraphs, different sentences, different pages, etc.). The data scanning system may provide the subject matter derived for the data file, and the content from each section to the machine learning model one at a time to determine whether each section of the data file includes sensitive data and the sensitivity level of the data in each section. This way, the data scanning system may tag a corresponding sensitivity level to each section of the data file based on the content of the corresponding section of the data file.

After tagging all of the sections included in the data file, the data scanning system of some embodiments may verify the sensitivity levels of the different sections in the data file with the content creator of the data file. The data scanning system may determine the content creator in different manners. For example, if the data file is labeled with an identity of the content creator (e.g., in the metadata of the data file), the data scanning system may identify the content creator based on the label. If no such label exists in the data file, the data scanning system may determine a content creator for the data file based on matching the subject matter of the data file to a person (or a group) within the organization who is most likely to be the creator of such a data file.

In some embodiments, the data scanning system may store information associated with different people (and different groups) associated with the organization. The information may indicate the type of subject matter that is most associated with the people based on their roles and their activities in the organization. For example, the data scanning system may determine a title and job description of each person in the organization. The data scanning system may also monitor the activities conducted by each person in the organization (e.g., online browsing activities, network activities, data access activities, etc.). The data scanning system may then derive the subject matter information for each person based on the roles and the monitored activities of the people associated with the organization. Based on the subject matter derived for the data file and the subject matter information associated with different people, the data scanning system may identify a particular person (or a particular group) associated with the organization who is most likely be the creator for that data file.

After determining the content creator of the data file, the data scanning system may transmit the tagged data file to the content creator (e.g., to a user account of the content creator). The data scanning system may provide a user interface through which the content creator can confirm and/or edit the sensitivity levels of the different sections of the data file. The data scanning system may update the tags based on the inputs from the content creator.

To improve the efficiency of tagging and classifying data file, the data scanning system of some embodiments may automatically tag sections of multiple data files that share the same content. For example, after tagging the different sections of a data file, the data scanning system may search the one or more data repositories to determine whether other data files in the data repositories include content that corresponds to (include the same content as) any tagged section of the tagged data file. If another data file includes the same content as a section of the tagged data file, the data scanning system may automatically tag the corresponding section of the other data file using the same sensitivity level of the section of the data file.

In some embodiments, the data scanning system may assign a clearance classification for the data file based on the sensitivity levels tagged to the different portions of the data file. For example, the data scanning system may assign a clearance classification for the data file that corresponds to the highest sensitivity level that is tagged to one or more sections of the data file. The clearance classification assigned to the data file can be subsequently used for access control in association with the data file. For example, the data scanning system or a user (e.g., an employee of the organization) may determine who can access the data file based on the clearance classification. In some embodiments, when a user attempts to access a data file in the data repositories, the data scanning system may first determine a clearance level of the user within the organization, and may determine whether to grant the user access to the data file based on a comparison between the clearance level of the user and the clearance classification assigned to the data file. The data scanning system may grant the user access to the data file when the clearance level of the user is the same or higher than the clearance classification assigned to the data file, and may deny the user from accessing the data file when the clearance level of the user is lower than the clearance classification assigned to the data file.

In some embodiments, the data scanning system may also monitor and facilitate access control over the transfers of data files among different users. For example, the data scanning system may monitor communication of data files to various people, and may perform access control functionalities as users attempt to communicate a data file to one or more persons (e.g., via an email, a chat program, a SMS message, or other communication means). In one example, when a user includes content of a data file in a communication (e.g., attaching the data file in an email, copying and pasting portions of the data file in a chat session, etc.), the data scanning system may identify one or more recipients of the communication. The data scanning system may determine the clearance levels of the one or more recipients, and may allow the communication to go through (or deny the transmission of the communication) based on the clearance levels of the one or more recipients and the clearance classification assigned to the data file.

In some embodiments, since different sections of a data file may be tagged with different sensitivity levels, the data scanning system may advantageously allow certain section(s) of the data file to be communicated even if the clearance levels of the one or more recipients are lower than the clearance classification assigned to the data file. For example, when the data scanning system determines that a clearance level of any one of the recipients is lower than the clearance classification assigned to the data file, the data scanning system may scan the different sections of the data file. The data scanning system may determine that the clearance levels of the one or more recipients are compatible or in compliance with one or more sections in the data file based on the sensitivity tags associated with the one or more sections. The data scanning system may then permit transfer of the one or more sections (but not the entire data file) in the communication. For example, if the user attempts to copy and paste the entire text of a text document in an e-mail or text message, the copied text may be included in a clipboard associated with an operating system of a user device of the user. The data scanning system may remove, from the clipboard, one or more sections of the text that are tagged with sensitivity levels not incompatible with the clearance level of the recipients. The data scanning system may still permit the user to paste the remaining text to the communication and transmit to the recipients. This way, the user is still able to share at least some information from the text document with the recipients, instead of being completely denied of sharing any information from the text document. This dynamic sharing of data is only achievable due to the modular data classification and dynamic access control functionalities performed by the data scanning system.

This dynamic sharing of data can be applied to other data transfer scenarios as well. For example, when a user attempts to copy content from a source data file to a target data file (e.g., a text file, a multi-media file, etc.), the data scanning system may determine a clearance classification assigned to the target data file. As the user copies the content (the content being the entirety of the data file or a portion of the data file) from the source data file, the data scanning system may determine the sensitivity levels associated with different sections of the content. If the clearance classification assigned to the target data file is compatible with the sensitivity levels of all of the sections of the copied content, the data scanning system will permit the pasting of the content to the target data file without modifications. However, if one or more sections in the copied content are incompatible with the clearance classification assigned to the target data file, the data scanning system may determine what content can be shared, such as to halt the copy and paste operation, access a clipboard that temporarily holds the copied content, and remove the one or more sections from the clipboard. The data scanning system may then resume the copy and paste operation, such that the remaining sections of the content are inserted into the target data file.

As data files (or sections of data files) are copied and/or duplicated, multiple copies of the same content may be stored in the data repositories, which can lead to inconsistent labeling of data files for the organization as discussed above. For example, data is often re-classified due to different factors, such as a length of time having been passed since the creation of the data, a change of laws and regulations, events such as public disclosure events, etc. A change of the sensitivity level of a section of a data file (e.g., manually by the content creator or by the data scanning system) may lead to inconsistency when the sensitivity levels of the corresponding sections, that include the same content that has been duplicated in other data file, are not changed in the same manner.

As such, in some embodiments, when one or more sections of content from a source data file are copied to a target data file (which can also be a target communication, such as an e-mail, a chat utterance, a SMS message, etc.), the data scanning system may establish links between each of the copied sections from the source data file and the corresponding section in the target data file. Each link may be implemented as metadata inserted into the source data file and/or the target data file, such that each of the source and target data files can refer to the other data file. The links may also be implemented as database entries that refer to both sections in the source data file and the target data file. After the links are established, they may be used by the data scanning system to update the source data file and/or the target data file based on a change to the sensitivity level associated with a section in the source data file or the target data file. For example, when the sensitivity level of a section in the source data file is changed, the data scanning system may automatically use the link associated with the section to identify locations of corresponding sections (having the same content) in other data files (e.g., the target data file) to update the sensitivity levels of the corresponding sections. This way, the sensitivity levels of different copies of the same content are ensured to be consistent with each other.

If it is determined that the sensitivity level of the section in the source data file is changed (e.g., the sensitivity level has been increased) such that it is no longer compatible with the clearance classification assigned to the target data file, the data scanning system may either remove the corresponding section from the target data file or increase the clearance classification assigned to the target data file to ensure that the clearance classification assigned to the target data file is correct.

In some embodiments, the data scanning system may also establish links between a source data file and a target data file when a section from the source data file is unsuccessfully copied to the target data file. This scenario arises when a user attempts to copy one or more sections from the source data file to the target data file, and the data scanning system prevents a particular section from the one or more sections to be copied to the target data file due to the sensitivity level of the particular section not being compatible with the clearance classification assigned to the target data file. However, as discussed herein, the sensitivity level of certain content may change over time. Thus, when it is detected that the sensitivity level of the particular section in the source data file has been changed (such as having been lowered), the data scanning system may determine whether the updated sensitivity level of the particular section is now compatible with the clearance classification assigned to the target data file. If the updated sensitivity level is compatible with the clearance classification assigned to the target data file, the data scanning system may insert the particular section to the target data file, as a modification to the original copy-and-paste operation. As such, content that was denied from being transferred initially to the target data file based on the initial sensitivity level of the content may be added back to the target data file after the sensitivity level of the content is updated, such that the sharing of information within the organization can be facilitated in a dynamic manner.

FIG. 1 illustrates a networked system 100, within which the data scanning system may be implemented according to one embodiment of the disclosure. The networked system 100 includes a service provider server 130, user devices 110, 180, and 190, and data repositories 152, 154, and 156 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

Each of the data repositories 152, 154, and 156 may be associated with the service provider server 130 and configured to store digital data files (also referred to as "digital files," "documents," or "digital documents") associated with the service provider server 130. For example, various users associated with the service provider server 130 (such as a user 140 (person or computing system) of the user device 110 and users of the devices 180 and 190) may create (or otherwise obtain) digital files (e.g., text files, multi-media files, image files, etc.), and may store the digital files in any one of the data repositories 152, 154, and 156. The digital files that are stored in the data repositories 152, 154, and 156 may include information that is associated with the operation of an organization associated with the service provider server 130. For example, the digital files may include data associated with customers of the organization (e.g., login credentials for logging in to accounts with the organization, attributes of the customers, etc.), data associated with various transactions conducted by the customers with the organization, internal policies associated with the organization, information related to the usage of various systems and/or modules (e.g., a website, a particular program, etc.) associated with the organization, and other information. As such, the digital files may be frequently added, deleted, edited, shared, and/or transmitted by and among users of the organization or even people external to the organization (e.g., vendors, customers, etc.).

The user device 110, in one embodiment, may be utilized by a user 140 to interact with the service provider server 130, the user devices 180 and 190, and/or the data repositories 152, 154, and 156 over the network 160. For example, the user 140 may use the user device 110 to create a digital file and store the digital file in any one of the data repositories 152, 154, and 156, browse, access, and edit any digital files stored in any one of the data repositories 152, 154, and 156, transmit or share any digital files stored in any one of the data repositories 152, 154, and 156. For example, the user device 110 may include a text editing application 114 configured to enable a user (e.g., the user 140) to generate and/or edit a text document, and save the text document in any one of the data repositories 152, 154, and 156. The user 140 may also use the text editing application 114 to transfer content from one data file to another data file (e.g., via a copy-and-paste operation), combine content from different data files, or modify existing content in one of the data files. In addition to the text editing application 114, the user device 110 of some embodiments may also include other applications that may enable the user 140 to generate and/or edit other types of data files (e.g., an image file, a video file, an audio file, etc.).

In some embodiments, the user device 110 may also include a communication application 112 (e.g., an email client application, an SMS message client application, a file sharing client application, etc.) configured to enable the user 140 to transmit and/or share data files with other users (e.g., users of the devices 180 and 190) within the organization and/or people external to the organization (e.g., vendors, customers, etc. of the organization). For example, the user 140 may attach a data file stored in any one of the data repositories 152, 154, and 156 in an email message to be sent to another email account.

In various implementations, the user 140 is able to input data and information into an input component (e.g., a keyboard) of the user device 110. For example, the user 140 may use the input component to interact with the text editing application (e.g., to edit a data file, to generate new data in a data file, etc.) and/or the communication application 112 (e.g., to transmit a data file to another user device, etc.).

In some embodiments, the user device 110 may also include an event detection module 116 that implements at least a portion of the data scanning system as disclosed herein. The event detection module 116 may monitor activities conducted by the user 140 on the user device 110 (e.g., browsing activities, network activities, data access activities, data transfer activities, etc.). In some embodiments, the event detection module 116 may coordinate with the data scanning module 132 to perform the functionalities of the data scanning system as disclosed herein. For example, upon detecting an event (e.g., a data access event, a data transfer event, a change of sensitivity level of a section in a data file, etc.), the event detection module 116 may transmit information associated with the event to the data scanning module 132 for analysis. As such, in some embodiments, the event detection module 116 may be implemented as an add-on component associated with the operating system of the user device 110 such that the event detection module 116 may receive signals related to the initiation of the events and/or causing certain events to be modified.

The event detection module 116 may also receive instructions from the data scanning module 132 (the instructions may be generated by the data scanning module 132 based on the information associated with one or more events detected by the event detection module 116), and may perform one or more actions to the user device 110 based on the instructions (e.g., denying a transfer of a data file, denying an insertion of a section of a document to another document, modifying copied data before the modified data is inserted into a data file, etc.).

Each of the devices 180 and 190 may have similar components as the user device 110 and may enable the respective users of the devices 180 and 190 to interact with the data repositories 152, 154, and 156, and the service provider server 130.

The service provider server 130, in one embodiment, may be maintained by a transaction processing entity or an online service provider, which may provide processing for electronic transactions between users and one or more merchants. As such, the service provider server 130 may include a service application 138, which may be adapted to interact various user devices of users and/or the merchant servers over the network 160 (e.g., or a different network) to facilitate the electronic transactions (e.g., electronic payment transactions, data access transactions, etc.) among users and merchants processed by the service provider server 130. In one example, the service provider server 130 may be provided by PayPal®, Inc., of San Jose, California, USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities. In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may also include an interface server 134 that is configured to serve content (e.g., web content) to users and interact with users. For example, the interface server 134 may include a web server configured to serve web content in response to HTTP requests. In another example, the interface server 134 may include an application server configured to interact with a corresponding application (e.g., a service provider mobile application) installed on the devices 110, 180, and 190 via one or more protocols (e.g., RESTAPI, SOAP, etc.). As such, the interface server 134 may include pre-generated electronic content ready to be served to users. For example, the interface server 134 may store a log-in page and is configured to serve the log-in page to users for logging into user accounts of the users to access various service provided by the service provider server 130. The interface server 134 may also include other electronic pages associated with the different services (e.g., electronic transaction services, etc.) offered by the service provider server 130. As a result, a user (who is internal or external to the organization) may interact with the service provider server 130 via the user interfaces generated by the interface server 134. For example, a user may access various pages on a website of the service provider server 130, access a user account associated with the user, and access various services offered by the service provider server 130, by generating HTTP requests directed at the service provider server 130. In another example, the user 140 may submit a transaction request via the interface generated by the interface server 134.

The service provider server 130, in one embodiment, may be configured to maintain one or more accounts (e.g., user accounts, merchant accounts, etc.) in an account database 136, each of which may be associated with a profile and may include account information associated with one or more individual users and merchants. For example, account information may include user information such as a gender, an address, an education level, an income level, an email address, etc., financial information such as bank account identifiers, payment card identifiers, etc., credential information such as one or more account numbers, passwords, transaction history, device information such as an Internet Protocol (IP) addresses, a device identifier, a device type, etc., and other information related to the user account. In some embodiments, the account databased 136 may be implemented within one or more of the data repositories 152, 154, and 156.

In one implementation, a user may have identity attributes stored with the service provider server 130, and the user may have credentials to authenticate or verify identity with the service provider server 130. User attributes may include personal information, banking information and/or funding sources. In various aspects, the user attributes may be passed to the service provider server 130 as part of a login, search, selection, purchase, and/or payment request, and the user attributes may be utilized by the service provider server 130 to associate the user with one or more particular user accounts maintained by the service provider server 130 and used to determine the authenticity of a request from a user device. As such, in order to verify the identities of the users, the service provider server 130 may store these identity attributes within one of more data files in one of the data repositories 152, 154, and 156. As the user attributes are passed to the interface server 134 as part of a transaction process (e.g., a login process, a payment transaction process, etc.), the service provider server 130 may compare the user attributes received from the users against the identity attributes stored in the data files.

In various embodiments, the service provider server 130 also includes a data scanning module 132 that cooperate with the event detection module 116 to implement the functionalities of the data scanning system as disclosed herein. For example, the data scanning module 132 may classify data files (and sections of each data file) stored in the data repositories 152, 154, and 156. The data scanning module 132 may also perform various data access control functionalities based on the classifications of the data files.

Figure 2:
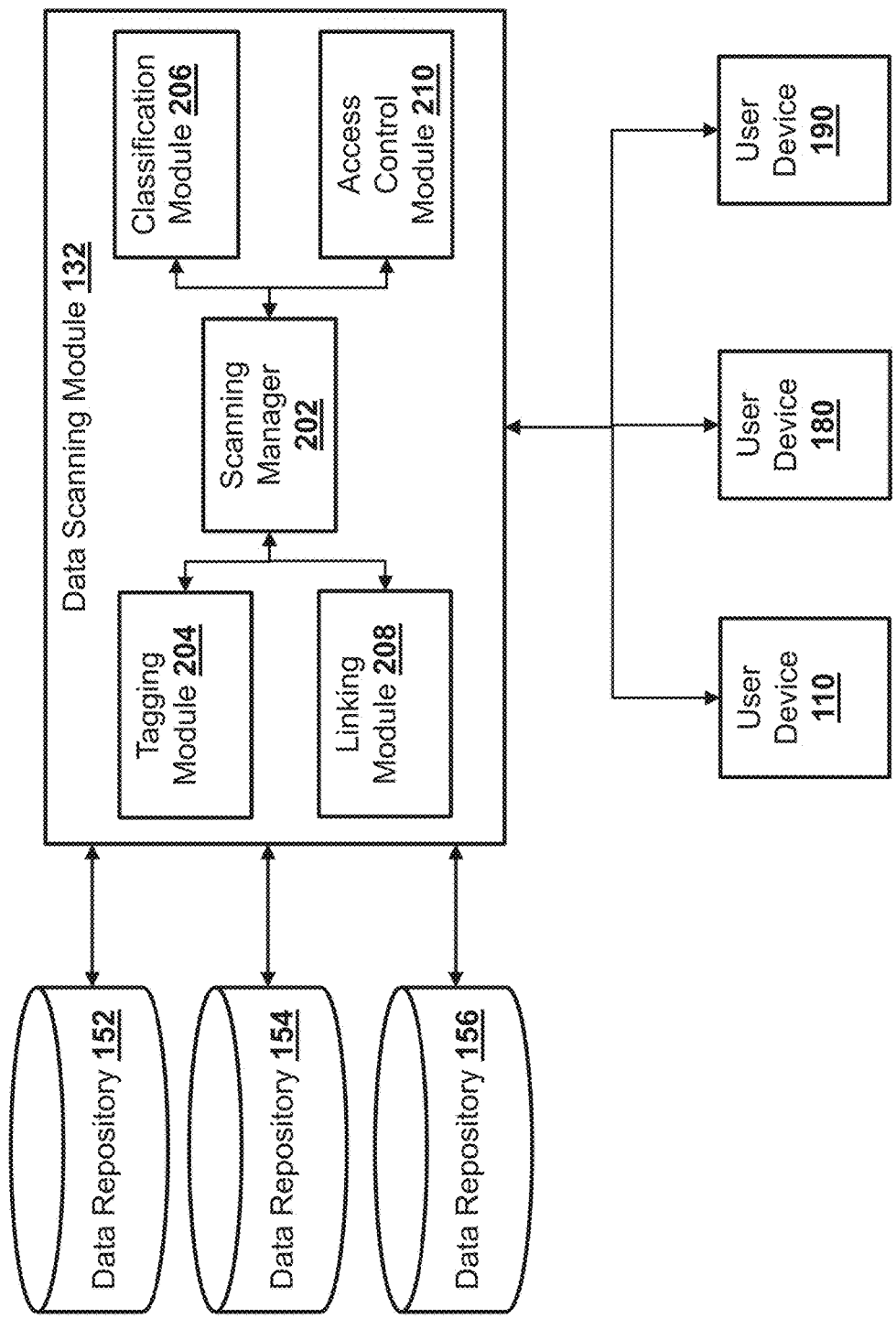
FIG. 2 is a block diagram illustrating a data scanning module according to an embodiment of the present disclosure.

FIG. 2 illustrates a block diagram of the data scanning module 132 and interactions with the same according to various embodiments of the disclosure. As shown, the data scanning module 132 includes a scanning manager 202, a tagging module 204, a classification module 206, a linking module 208, and an access control module 210. The scanning manager 202 may be configured to scan and analyze each data file that is stored in any one of the data repositories 152, 154, and 156. The scanning manager 202 may access a data repository (e.g., the data repository 152), and accesses a data structure of the data repository 152. The scanning manager 202 may traverse the data structure (e.g., the different folders in the data structure) of the data repository 152. In each folder of the data structure, the scanning manager 202 may access each file stored in the folder and assign a clearance classification to the file.

As discussed herein, the data files stored in the data repositories 152, 154, and 156 may store different kinds of data in association with the operations of the organization associated with the service provider server 130. The data stored in the data repositories 152, 154, and 156 may include public data that may be accessed by anyone (including internal users such as workers/agents of the organization and external users such as customers or vendors of the organization, etc.) through publicly available resources and sites. Examples of public data may include marketing materials, information for assisting users in using a computer application in the public domain (e.g., a website hosted by the service provider server 130, etc.), external policies that affect customers and/or vendors, etc. The data stored in the data repositories 152, 154, and 156 may also include internal data that may be accessed only by internal users of the organization. Examples of such internal data include information associated with an organization structure of the organization, planned changes to the organization that have not been made public yet (e.g., a potential mergers or acquisition, etc.), layout and security protocols of physical facilities of the organization, etc. The data stored in the data repositories 152, 154, and 156 may also include classified data that may be accessed only by certain groups of the internal users. Example of such classified data includes salary data of the employees of the organization, credential data for accessing various user accounts with the service provider server 130, encryption keys used for encrypting confidential data, financial account data of users of the service provider server 130, etc.

Due to the various kinds of data being stored in the data repositories 152, 154, and 156, it is crucial for the organization to maintain proper access control to the different data such that unauthorized people are prevented from accessing the data, which may lead to data breaches and leaks and fraudulent use of such data. In order to facilitate access control to the data, the data files may be assigned to different clearance classifications. In some embodiments, each user may also be assigned a clearance level, such that each user can only access data files having a clearance classification equal to or lower than the clearance level of the user. The users may be assigned a clearance level based on a set of criteria, including whether the user is an internal user or an external user, an internal role/title of the user, a group/department to which the user belong, and other criteria. In a non-limiting example, the data scanning module 132 may determine to assign each data file to any one of five different clearance classifications for the organization, where a clearance classification of 1 being the highest and accessible only by limited personnel (e.g., executives, directors, etc.), and a clearance classification of 5 being the lowest and accessible by anyone.

While only five clearance classifications are used to classify the data files of the organization, it has been contemplated that different numbers of clearance classifications (more or less than five) may be used by the data scanning module 132 to classify data files based on various factors associated with the organization.

In some embodiments, the data scanning module 132 may analyze the content of each data file stored in the data repositories 152, 154, and 156, and classify the data file based on the analysis. For example, as the scanning manager 202 accesses a data file, the scanning manager 202 may analyze the content of the data file. If the data file includes text data, the scanning manager 202 may parse the text to determine whether any portion(s) of the text includes sensitive data. If the data file includes audio data and/or image data, the scanning manager 202 may first derive text data from the audio/image data (e.g., by transcribing the audio data, by performing an optical character recognition analysis on the image data, etc.), and determine whether any portion(s) of the audio/image data includes sensitive data. If the data file includes video data, the scanning manager 202 may perform the transcription process to the audio portion of the video and the optical character recognition analysis on the image portion of the video to derive text data.

The scanning manager 202 may then analyze the text to determine whether any portion of the text includes sensitive data. Since sensitive data can come in different forms, and may share similarities with (e.g., look like) non-sensitive data (or less sensitive data), it would be advantageous for the scanning module 202 to classify the data file based on a subject matter (e.g., a topic) associated with the data file. For example, when analyzing a sequence of 16-digit number, the scanning module 202 may be more likely to determine that number corresponds to a credit card number (i.e., sensitive data) if the subject matter of the data file is associated with financial accounts of customers, and may be more likely to determine that the number corresponds to a tracking number (e.g., non-sensitive data) if the subject matter of the data file is associated with shipment information. Similarly, when analyzing a series of monetary amounts, the scanning module 202 may be more likely to determine that the series of monetary amounts is sensitive data if the subject matter of the data file is associated with customer transaction records, and may be more likely to determine that the series of monetary amounts is non-sensitive data if the subject matter of the data file is associated with prices of products offered for sale by the organization.

As such, in some embodiments, the scanning manager 202 may first derive a subject matter that is associated with the data file. In some embodiments, the scanning manager 202 may first identify one or more sections of the data file that are most indicative to the subject matter of the data file. For a text data file, the one or more sections may correspond to an opening paragraph and a closing paragraph. For a multi-media file, the one or more sections may correspond to the first time period and the last time period of the file. The scanning manager 202 may use a natural language processing technique to analyze the text of the one or more sections, and derive the subject matter of the data file based on the analysis.

Similar to the clearance classifications, the scanning manager 202 of some embodiments may determine different sensitivity levels for the data based on how sensitive the data is to the organization. For example, the scanning manager 202 may also determine five different sensitivity levels of the data associated with the organization. As such, the scanning manager 202 may classify each piece of data as any one of the five different sensitivity levels.

For example, the scanning manager 202 may parse the remaining sections of the data file, and may determine, for each piece of text in the remaining sections, a sensitivity level of the text. In some embodiments, the scanning manager 202 may provide the subject matter associated with the data file and the remaining sections of the data file to a machine learning model. The machine learning model may be configured and trained to determine whether any piece of data in the remaining sections (and which piece of data) corresponds to sensitive data, and the sensitivity level of the sensitive data.

When the scanning manager 202 (or the machine learning model) determines that a piece of text in the data file corresponds to a social security number of a customer of the organization, the scanning manager 202 may classify the piece of text as highly sensitive (e.g., a sensitivity level of 1, where 1 being the highest level of sensitivity). Conversely, when the scanning manager 202 (or the machine learning model) determines that a piece of text in the data file corresponds to information that is available in a public domain (e.g., a user agreement for a website of the organization, etc.), the scanning manager 202 may classify the piece of text as non-sensitive (e.g., a sensitivity level of 5, where 5 being the lowest level of sensitivity). The classification module 206 may then classify the data file based on the sensitivity levels of the different pieces of data included in the data file. For example, the scanning manager 202 may classify the data file based on the piece of data having the highest sensitivity level in the data file. If the piece of data having the highest sensitivity level in the data file has a sensitivity level of 3, the scanning manager 202 may assign a clearance classification of 3 to the data file.

By properly assigning clearance classifications to different data files in the data repositories 152, 154, and 156, the data scanning module 132 may perform data access control in an accurate manner to prevent unauthorized access of data files. However, as illustrated herein, a single data file may include different types of data, and data having different sensitivity levels may be scattered at different portions of the data file. In one example, a data file may include mostly data of the lowest sensitivity level except for one piece of data. However, a higher clearance classification (e.g., a clearance classification of 4, etc.) may be assigned to the data file due to the existence of that one piece of data in the data file, which prevents many people (e.g., external users, internal users who do not have a clearance higher than or equal to 4, etc.) from accessing the data file even though some of the data included in the data file may be useful to those people.

Thus, it is advantageous for the data scanning module 132 to label different sections within a document with different sensitivity levels such that the data access control can be performed by the data scanning module 132 at a more granular level. As such, in some embodiments, the data scanning module 132 may perform modular classification of data within a data file. For example, the data scanning module 132 may independently classify different sections of the data file based on the content within the different sections. The data file may be divided up into different sections, where each section corresponds to a distinct portion of the data file document (e.g., different paragraphs, different sentences, different pages, etc.).

For example, the scanning manager 202 may divide the data file into multiple sections, where each section may correspond to a distinct portion of the data file (e.g., different paragraphs, different sentences, different pages, etc.). The scanning manager 202 may provide the subject matter derived for the data file, and the content from each section to the machine learning model one at a time to determine whether each section of the data file includes sensitive data and the sensitivity level of the data in each section. The scanning manager 202 may then use the tagging module 204 to tag a corresponding sensitivity level to each section of the data file based on outputs of the machine learning model.

Figure 3A:
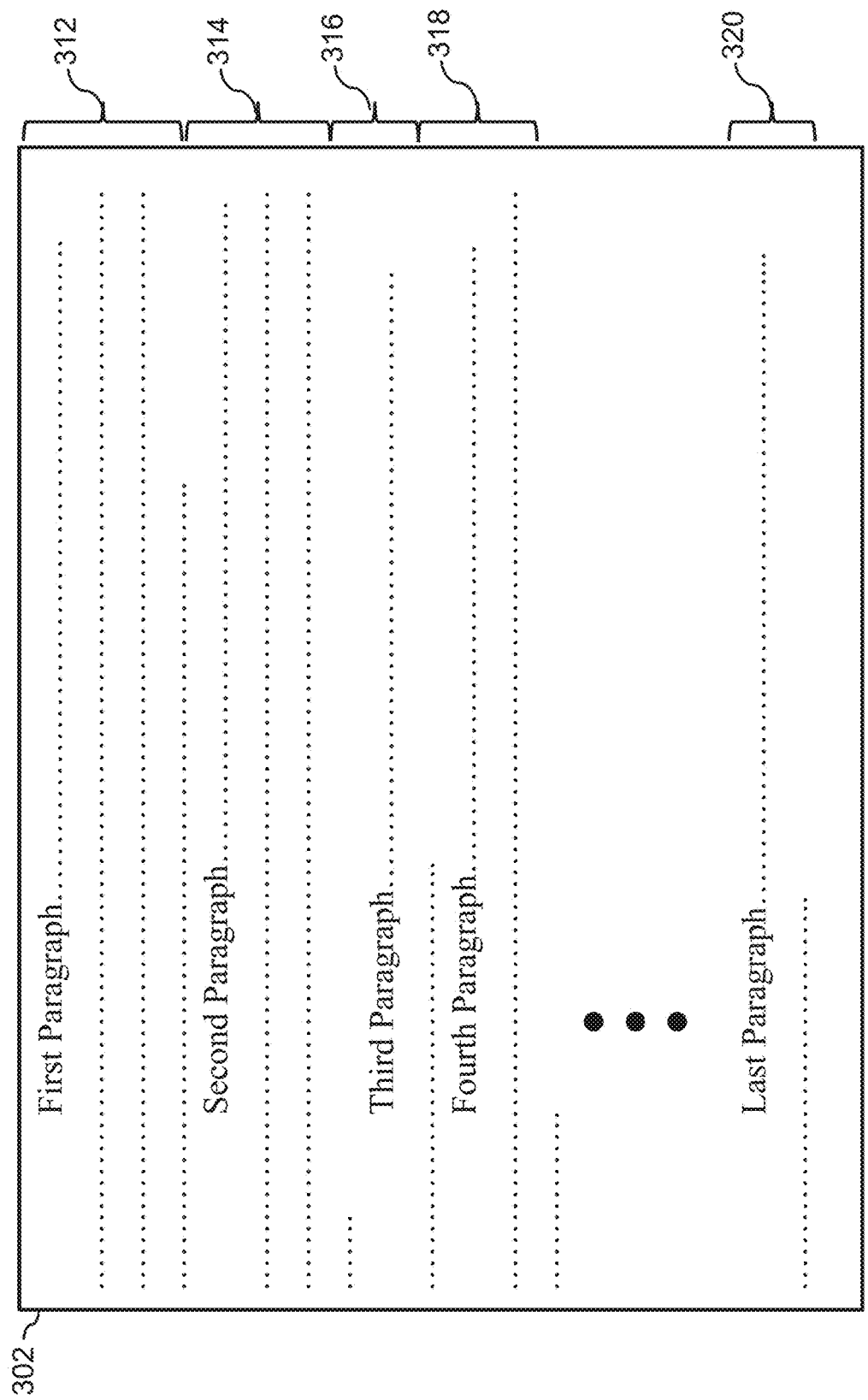
FIGS. 3A and 3B illustrate and example data flow for scanning and tagging a data file according to an embodiment of the present disclosure.
Figure 3B:
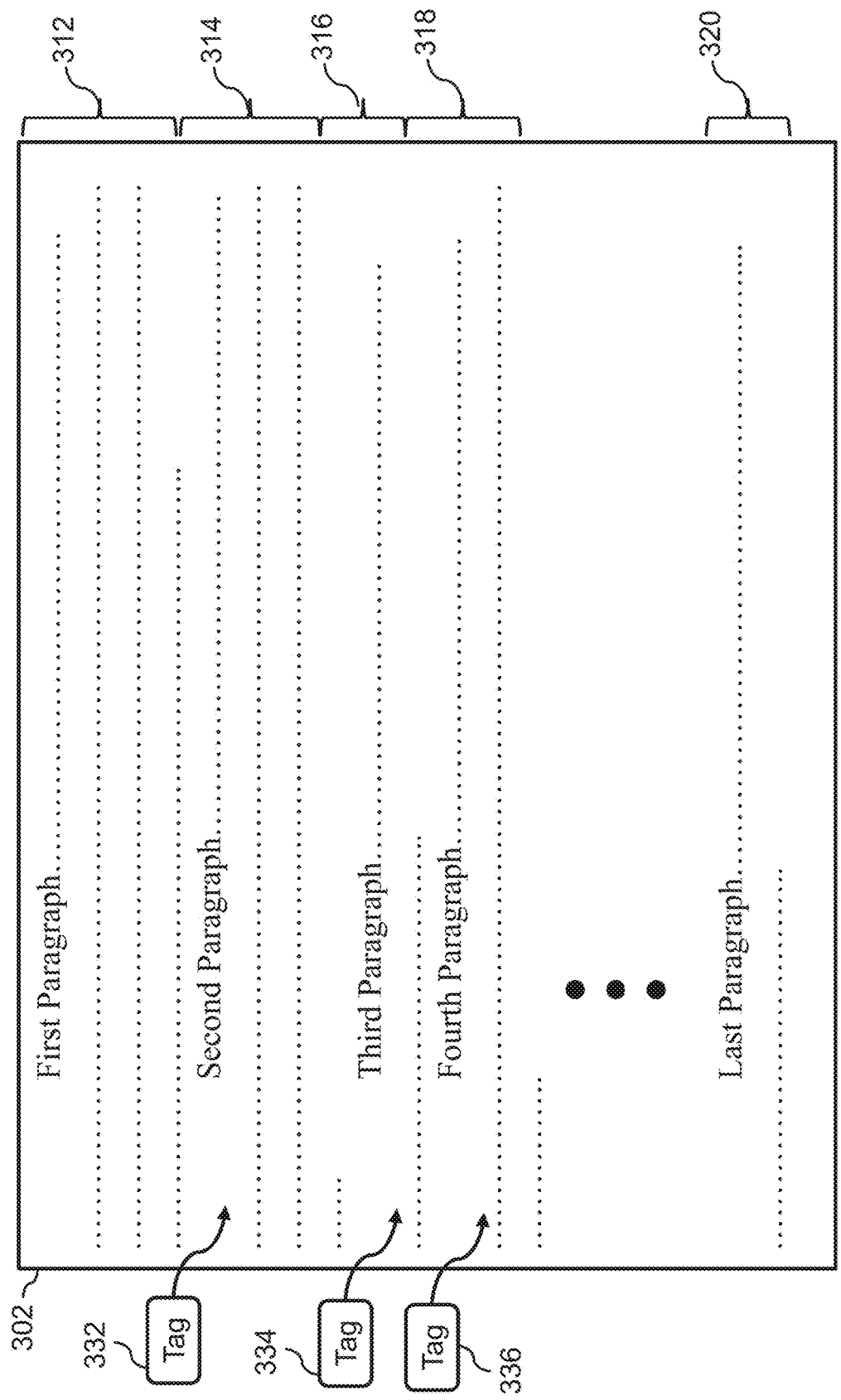

FIG. 3A-3B illustrate an example of modular classification of data in a data file according to various embodiments of the disclosure. Specifically, FIG. 3A illustrates different sections within a data file 302, and FIG. 3B illustrates tagging the different sections of the data file 302 with different sensitivity levels. As shown in FIG. 3A, the data file 302 is a text document that includes multiple paragraphs, sections, or content. The data scanning module 132 may access the data file 302 based on traversing a data structure within one of the data repositories 152, 154, and 156. In some embodiments, the scanning manager 202 may divide the data file 302 into different sections 312, 314, 316, 318, and 320 corresponding to the different paragraphs of the text document.

In some embodiments, the scanning manager 202 may identify one or more sections of the data file 302 (e.g., the first paragraph 312 and the last paragraph 320) for deriving a subject matter for the data file 302. The scanning manager 202 may parse the content of the paragraphs 312 and 320, and may use a natural language processor to derive the subject matter of the data file 302. The scanning manager 202 may then use the content of each of the remaining paragraphs and the subject matter to determine whether each paragraph includes sensitive data, and the sensitivity level of the sensitive data. In some embodiments, the scanning manager 202 may provide the subject matter and the content of each paragraph (e.g., the paragraphs 314, 316, and 318) to a machine learning model configured and trained to detect sensitive data within a text content. Based on the output of the machine learning model, the tagging module 204 may tag the corresponding paragraph with a sensitivity tag.

FIG. 3B illustrates the different tags 332, 334, and 336 being associated with the corresponding paragraphs 314, 316, and 318 in the data file 302. For example, based on the subject matter of data file 302 and the content associated with each of the paragraphs 314, 316, and 318, the tagging module 204 may associate corresponding sensitivity level tags 332, 334, and 336 to the respective paragraphs 314, 316, and 318. The different tags 332, 334, and 336 may correspond to different sensitivity levels, when the paragraphs 314, 316, and 318 contain data of different sensitivity levels. In some embodiments, the tags 332, 334, and 336 may be implemented within the data file 302. For example, the tags 332, 334, and 336 may be implemented as hidden data corresponding to the different paragraphs 314, 316, and 318 within the content of the data file 302. In another example, the tags 332, 334, and 336 may be implemented within the metadata of the data file 302. Once the different sections of the data file 302 are tagged, the data scanning module 132 may use the tags 332, 334, and 336 to perform dynamic data access control functionalities, as discussed in more details herein.

Referring back to FIG. 2, in some embodiments, the data scanning module 132 may continue to classify different data files and tagging sections of the different data files stored in the data repositories 152, 154, and 156 using the techniques disclosed herein. In some embodiments, to improve the efficiency and consistency of tagging data, once various sections of a data file (e.g., the data file 302) are tagged, the scanning manager 202 may traverse the data structures of the data repositories 152, 154, and 156 to determine if any other data files include the same content of the tagged sections of the data file 302. If the scanning manager 202 determines that another data file includes the same content as a tagged section (e.g., the paragraph 314) of the data file 302, the tagging module 204 may automatically tag the corresponding section of the other data file that includes the same content using the same tag (e.g., the tag 332) as the tagged section.

In some embodiments, the scanning manager 202 may verify the tags associated with different sections of the data file 302 and the clearance classification assigned to the data file 302 based on inputs from the content creator of the data file 302. The scanning manager 202 may identify the content creator of the data file 302 based on analyzing the metadata, such as if the metadata contains information indicating the creator of the data file 302. If the metadata of the data file 302 does not contain such information, the scanning manager 202 may determine a content creator for the data file 302 based on matching the subject matter of the data file 302 to a person (or a group) within the organization who is most likely to be the creator of such a data file.

In some embodiments, the data scanning module 132 may store information associated with different people, groups, or systems associated with the organization. The information may indicate the type of subject matter that is associated with the information based on their roles and their activities in the organization. For example, the data scanning module 132 may determine a title and job description of each person, group, or entity in the organization. The data scanning module 132 may also monitor the activities conducted by each person, group, or entity in the organization (e.g., online browsing activities, network activities, data access activities, etc.). The data scanning module 132 may then derive the subject matter information for each person, group, or entity based on the roles and the monitored activities of the people associated with the organization. Based on comparing the subject matter derived for the data file 302 and the subject matter information associated with different people, the scanning manager 202 may identify a particular person, group, or entity associated with the organization who is most likely be the creator for the data file 302.

After determining the content creator of the data file 302, the scanning manager 202 may transmit the tagged data file 302 to the content creator (e.g., to a user account of the content creator). The scanning manager 202 may provide a user interface through which the content creator can confirm and/or edit the sensitivity levels (e.g., the tags 332, 334, and 336) of the different sections 314, 316, and 318 of the data file 302. The scanning manager 202 may update the tags 332, 334, and/or 336 based on the inputs from the content creator.

Once the data files in the data repositories 152, 154, and 156 are tagged and classified, the data scanning module 132 and the event detection module 116 may cooperate with each other to perform the dynamic data access control functionalities as disclosed herein. For example, when a user (e.g., the user 140) attempts to access a data file, the event detection module 116 may detect such an attempt, and may notify the data scanning module 132 about the data access attempt. Based on the detected data access attempt, the data access module 210 may determine a clearance level of the user 140, and the clearance classification assigned to the data file that the user 140 attempts to access. The access control module 210 may grant, via the event detection module 116, the user 140 access to the data file when the clearance level of the user 140 is the same or higher than the clearance classification assigned to the data file, and may deny the user 140 from accessing the data file when the clearance level of the user 140 is lower than the clearance classification assigned to the data file.

In some embodiments, the data scanning module 132 and the event detection module 116 may also monitor and facilitate data access control over the transfers of data files among different users. For example, the event detection module 116 and the data scanning module 132 may monitor communication of data files among various users, and may perform access control functionalities as the users attempt to communicate a data file to one or more persons (e.g., via an email, a chat program, a SMS message, or other communication means). In one example, when a user includes content from a data file in a communication (e.g., attaching the data file in an email, copying and pasting portions of the data file in a chat session, etc.), the access control module 210 may identify one or more recipients of the communication. The access control module 210 may determine the clearance levels of the one or more recipients, and may allow the communication to go through (or deny the transmission of the communication) based on the clearance levels of the one or more recipients and the clearance classification assigned to the data file.

In some embodiments, since different sections of a data file may be tagged with different sensitivity levels, when a user (e.g., the user 140) attempts to transmit content from a data file to one or more recipients (e.g., the uses of the device 180 and 190), the data scanning module 132 may advantageously allow certain section(s) of the data file to be communicated even if the clearance levels of the one or more recipients are lower than the clearance classification assigned to the data file. For example, when the access control module 210 determines that a clearance level of any one of the recipients is lower than the clearance classification assigned to the data file, the scanning manager 202 may scan the different sections of the data file (that may be tagged with one or more sensitivity level tags). The access control module 210 may determine that the clearance levels of the one or more recipients are compliant with one or more sections in the data file based on the sensitivity tags associated with the one or more sections (e.g., the clearance levels are equal to or higher than the sensitivity levels of the sections in the data file). The access control module 210 may instruct the event detection module 116 to permit the transfer of the one or more sections (but not the entire data file) in the communication. For example, if the user 140 attempts to perform a copy-and-paste operation on the entire text of the data file in an e-mail, the copied text may be included in temporary data storage of the user device 110 (e.g., a clipboard associated with an operating system of the user device 110). Based on the instruction from the access control module 210, the event detection module 116 may remove, from the clipboard, one or more sections of the text that are tagged with sensitivity levels incompatible with the clearance level of the recipients. The event detection module 116 may still permit the user to paste the remaining text (including the one or more sections determined to be compliant with the clearance levels of the recipients) to the communication and transmit to the recipients. This way, the transmission of the content of the data file to the recipients is not completely denied, and the user 140 is still able to share at least some information from the data file with the recipients. This dynamic sharing of data is only achievable due to the modular data classification functionalities performed by the data scanning module 132 and the event detection module 116.

This dynamic sharing of data can be applied to other data transfer scenarios as well. For example, when the event detection module 116 detects that the user 140 (e.g., via the text editing application 114 of the user device 110) attempts to copy content (e.g., text, video, audio, visual, and/or a combination) from a source data file to a target data file (e.g., a text file, a multi-media file, etc.), the access control module 210 may determine a clearance classification assigned to the target data file. As the user 140 copies the content (the content being the entirety of the data file or a portion of the data file) from the source data file, the event detection module 116 and/or the access control module 210 may determine the sensitivity levels associated with different sections of the content based on the tags in the data file. If the clearance classification assigned to the target data file is compatible (e.g., complies or otherwise meets thresholds) with the sensitivity levels of all of the sections included in the copied content, the access control module 210 and/or the event detection module 116 will permit the pasting of the copied content to the target data file without modifications. However, if one or more sections in the copied content are incompatible with the clearance classification assigned to the target data file, the event detection module 116 (e.g., based on instructions received from the access control module 210) may halt (or instruct the operating system executed on the user device 110 to halt) the copy-and-paste operation. The event detection module 116 may access a clipboard used by the operating system for temporarily holding the copied content. The event detection module 116 may remove the one or more sections from the clipboard, and then resume (or instruct the operating system to resume) the copy-and-paste operation, such that the remaining sections of the content are inserted into the target data file.

Figure 4:
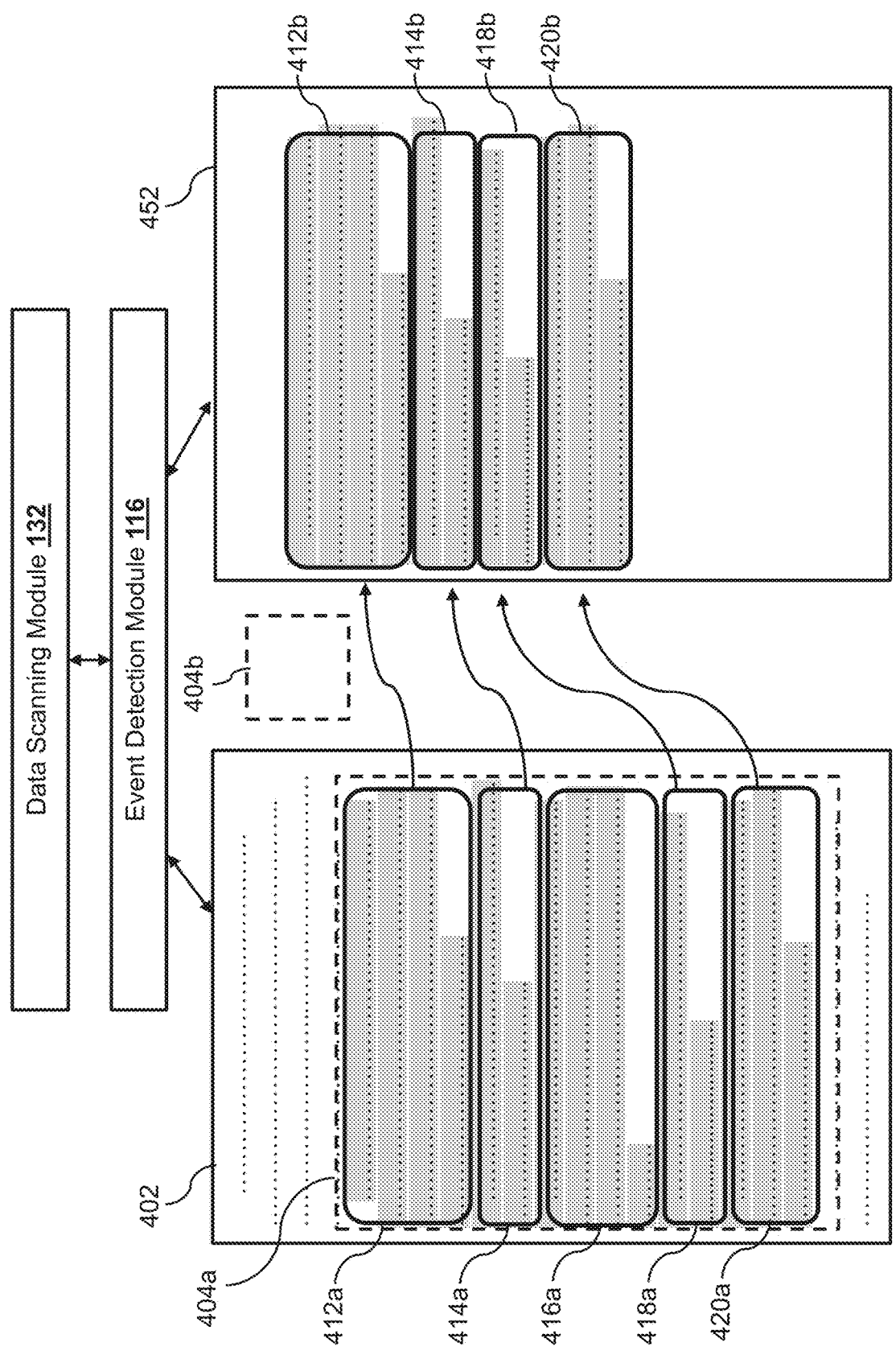
FIG. 4 illustrates a data access control mechanism when transferring data between data files according to an embodiment of the present disclosure.

FIG. 4 illustrates an example flow of such a dynamic data access control process according to various embodiments of the disclosure. In the example illustrated in FIG. 4, the user 140 has initiated a copy-and-paste operation via the user device 110 to copy several sections (including sections 412a, 414a, 416a, 418a, and 420a) of the content in the source data file 402 to the target data file 452. Specifically, the user 140 may first select (e.g., highlight) the sections 412a, 414a, 416a, 418, and 420a of the source data file 402, and perform an action (e.g., initiate copy operation such as by pressing "Ctrl-C"). The copy operation may involve copying the content of the sections 412a, 414a, 416a, 418, and 420a of the source data file 402 (and collectively referred to as copied content 404a) to a temporarily storage managed by the operating system of the user device 110, such as a clipboard. The user 140 may then initiate a paste operation onto the target data file 452 by performing an action (e.g., by pressing "Ctrl-V") on the target data file 452.

Under normal circumstances without the interferences from the event detection module 116 and the data scanning module 132, the entirety of the copied content 404a (the content stored on the clipboard) would be inserted into the target data file 452. When some of the sections from the copied content 404a are incompatible (e.g., does not meet thresholds) with the clearance classifications assigned to the target data file 452, the organization may risk misappropriating confidential and/or sensitive data to unauthorized personnel. As such, the data scanning module 132 and the event detection module 116 may dynamically modify the copied content 404a such that the content inserted into the target data file 452 would be compatible with the clearance classification assigned to the target data file, to eliminate the risk of misappropriating confidential and/or sensitive data.

In some embodiments, upon detecting the paste operation attempt by the user 140 via the user device 110, the event detection module 116 may suspend (or instruct the operating system of the user device 110 to suspend) the performance of the paste operation. The event detection module 116 may also transmit information associated with the copied content 404a and the target data file 452 (e.g., the tags associated with the sections 412a, 414a, 416a, 418a, 420a of the source data file 402 being copied, the clearance classification assigned to the target data file 452, etc.) to the data scanning module 132. Upon inspecting the sensitivity levels associated with the sections 412a, 414a, 416a, 418a, 420a of the source data file 402 and the clearance classification assigned to the target data file 452, the access control module 210 may determine that the sensitivity levels associated with the sections 412a, 414a, 418a, and 420a, but not the sensitivity level associated with the section 416a, are compatible with the clearance classification assigned to the target data file 452. For example, the target data file 452 may be assigned with a clearance classification of 3, and the sections 412a, 414a, 418a, and 420a have associated sensitivity levels of 3 or below while the section 416a has an associated sensitivity level of 2.

Accordingly, the access control module 210 may instruct the event detection module 116 to modify the copied content 404a stored in the clipboard before pasting the copied content into the target data file 452. Based on the instructions from the access control module 210, the event detection module 116 may modify the copied content 404a on the clipboard (e.g., by removing the section 416a from the copied content 404a) to generate modified content 404b on the clipboard. The event detection module 210 may then insert (or instruct the operating system of the user device 110 to insert based on resuming the paste operation) the modified content 404b on the clipboard to the target data file 452. As shown in the figure, the modified content 404b has been inserted into the target document 452 as sections 412b, 414b, 418b, and 420b corresponding to the sections 412a, 414a, 418a, and 420a in the source data file 402. In some embodiments, the event detection module 116 may also add the corresponding sensitivity level tags to the sections 412b, 414b, 418b, and 420b based on the sensitivity level tags associated with the sections 412a, 414a, 418a, and 420a.

The user 140 may, via the user device 110, continue to edit the target data file 452, store the target data file 452 in one of the data repositories 152, 154, and 156, and/or transmit the target data file 452 to other users. Since the content of the target data file 452 is compatible with the clearance classification assigned to the target data file 452, the risk of misappropriating data is greatly reduced. The new sections 412b, 414b, 418b, and 420b in the target data file 452 are also tagged with the sensitivity levels correspond to the ones associated with the sections 412a, 414a, 418a, and 420a (e.g., inheriting the sensitivity levels from the corresponding sections in the source data file 402). Thus, the data scanning module 132 and the event detection module 116 may continue to perform dynamic data access control functionalities as disclosed herein for the target data file 452 (e.g., when sections of the target data file 452 is copied and pasted into other data files, when content of the target data file 452 is being transmitted to recipients, etc.)

As data files (or sections of data files) are copied and/or duplicated, multiple copies of the same content may be stored in different areas of the data repositories 152, 154, and 156, which can lead to potential issues such as mislabeling/misclassification of data files, inconsistent classification of the data files and/or sections of the data files, etc. for the organization. For example, data is often re-classified due to different factors, such as a length of time having been passed since the creation of the data, a change of laws and regulations, events such as public disclosure events, etc. In some embodiments, the content creator, or the data scanning module 132, may modify the sensitivity level of certain data based on those factors. However, when multiple copies of the same content exist in the data repositories 152, 154, and 156, it becomes a challenge to track all of the data files that include the same content when the need to modify the sensitivity level arises. Inconsistency in labeling different data will arise when the sensitivity levels of one or more copies of the content are not updated.

In order to ensure correct and consistent labeling of data across the organization, the linking module 208 may establish links among data files having the same content. For example, when one or more sections of content from a source data file (e.g., the source data file 402) are copied to a target data file (e.g., the target data file 452) (the target data file can be a document or a communication, such as an e-mail, a chat utterance, a SMS message, etc.), the linking module 208 may establish links between each of the copied sections from the source data file 402 and the corresponding section in the target data file 452. For example, the linking module 208 may establish a link between the section 412a in the source data file 402 and the section 412b in the target data file 452, establish a link between the section 414a in the source data file 402 and the section 414b in the target data file 452, establish a link between the section 418a in the source data file 402 and the section 418b in the target data file 452, and establish a link between the section 420a in the source data file 402 and the section 420b in the target data file 452.

Each link may be implemented as metadata inserted into the source data file 402 and/or the target data file 452, such that each of the source and target data files can refer to, be associated with, or provided access to the other data file. The links may also be implemented as database entries that refer to both sections in the source data file 402 and the target data file 452. After the links are established, they may be used by the data scanning module 132 and/or the event detection module 116 to update the source data file 402 and/or the target data file 452 based on a change to the sensitivity level associated with a section in the source data file 402 or the target data file 452. For example, when it is detected that the sensitivity level of a section in the source data file 402 (e.g., the section 412a) is changed, the linking module 208 may automatically use the link associated with the section 412a to identify locations of corresponding sections in other data files (e.g., the section 412b in the target data file 452), and update the sensitivity levels of the corresponding sections. This way, the sensitivity levels of different copies of the same content are ensured to be consistent with each other.

When updating the sensitivity level of the corresponding section (e.g., the section 412b) in the target data file 452, the linking module 208 may determine whether the updated sensitivity level is still compatible with the clearance classification of the target data file 452. For example, if the updated sensitivity level (e.g., a sensitivity level of 2) is higher than the previous sensitivity level (e.g., a sensitivity level of 3), then the updated sensitivity level may no longer be compatible with the clearance classification of the target data file 452 (e.g., a clearance classification of 3). Upon such a determination, the linking module 208 may either remove the corresponding section (e.g., the section 412b) in the target data file 452 from the target document or increase the clearance classification assigned to the target data file 452 to ensure that the clearance classification assigned to the target data file 452 is compatible with the sensitivity levels of its content.

In some embodiments, the linking module 208 may also establish links between a source data file and a target data file when a section from the source data file is unsuccessfully copied to the target data file. This scenario arises when a user attempts to copy one or more sections from the source data file to the target data file, and the data scanning module 132 and/or the event detection module 116 prevents a particular section from the one or more sections to be copied to the target data file due to the sensitivity level of the particular section not being compliant with the clearance classification assigned to the target data file. In the example illustrated in FIG. 4, the section 416a is such a section. While the section 416a from the source data file 402 was not inserted into the target data file 452, the linking module 208 may establish a link between the source data file 402 and the target data file 452 with respect to the section 416a, indicating that a previous attempt to copy the section 416 over to the target data file 452 was made.

When it is detected that the sensitivity level of the section 416a in the source data file 402 has been changed (e.g., to a lower sensitivity level), the linking module 208 may identify other data files (e.g., the target data file 452) for which an attempt has been made to copy and/or transfer the section 416a, and determine whether the updated sensitivity level of the section 416a is now compatible with the clearance classification assigned to the target data file 452. If the updated sensitivity level is compatible with the clearance classification assigned to the target data file 452, the linking module 208 may insert the content associated with the section 416a to the target document, based on the copy-and-paste attempt previously made. As such, content that was denied from being transferred initially to the target data file based on the initial sensitivity level of the content may be added back to the target data file after the sensitivity level of the content is updated, such that the sharing of information within the organization can be facilitated in a dynamic manner.

Figure 5:
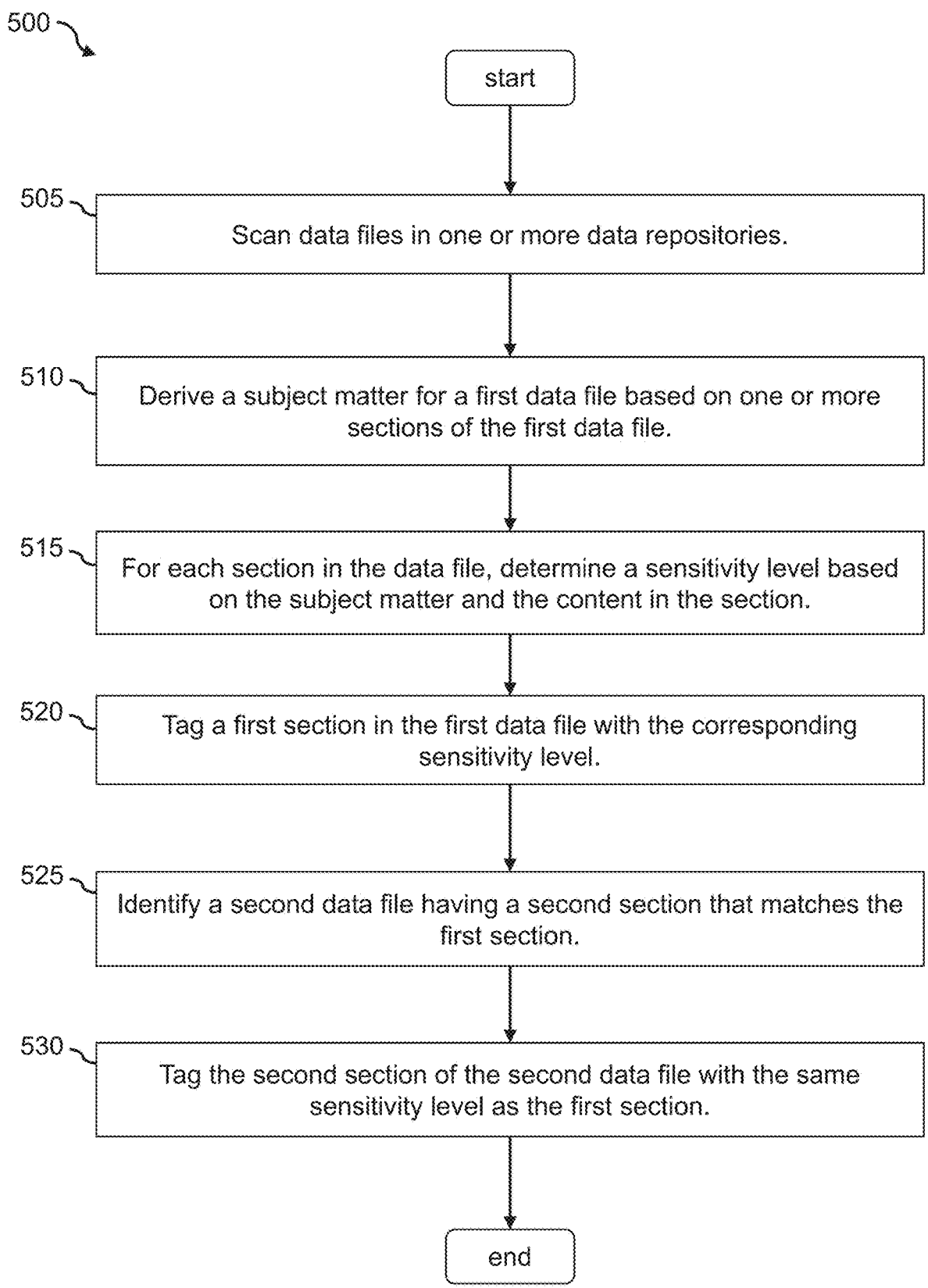
FIG. 5 is a flowchart showing a process of modularly classifying data according to an embodiment of the present disclosure.

FIG. 5 illustrates a process 500 for performing data classifications according to various embodiments of the disclosure. In some embodiments, at least a portion of the process 500 may be performed by the data scanning module 132. The process 500 begins by scanning (at step 505) data files in one or more data repositories. For example, the data scanning module 132 may traverse data structures within the data repositories 152, 154, and 156 to access different data files stored in the data repositories 152, 154, and 156.

The process 500 then derives (at step 510) a subject matter for a first data file based on one or more sections of the first data file. For example, the data scanning module 132 may identify one or more sections within a data file (e.g., the data file 302), and may parse the content within the one or more sections. In some embodiments, when the content comprises text data, the data scanning module 132 may use a natural language processor to analyze the content of the one or more sections, and derive a subject matter for the data file 302 based on the analysis.

For each section in the data file, the process 500 determines (at step 515) a sensitivity level based on the subject matter and the content in the section, and tags (at step 520) a first section in the first data file with the corresponding sensitivity level. For example, the data scanning module 132 may provide the content of each section and the subject matter derived for the data file 302 to a machine learning model. The machine learning model may be configured to determine, based on the subject matter of the data file 302, whether the content provided includes any sensitive data, and the sensitivity level of the sensitive data. The data scanning module 132 may determine a sensitivity level for the section based on an output of the machine learning model. The data scanning module 132 may then tag the section of the data file 302 with the sensitivity level.

The process 500 then identifies (at step 525) a second data file having a second section that matches the first section, and tags (at step 530) the second section of the second data file with the same sensitivity level as the first section. For example, after tagging the different sections in the data file 302, the data scanning module 132 may search through other data files in the data repositories 152, 154, and 156 to determine whether another data file includes the same content as a tagged section in the data file 302. If another data file is identified to have the same content as a tagged section of the data file 302, the data scanning module 132 may automatically tag the corresponding section of the other data file using the same sensitivity level as the tagged section of the data file 302.

Figure 6:
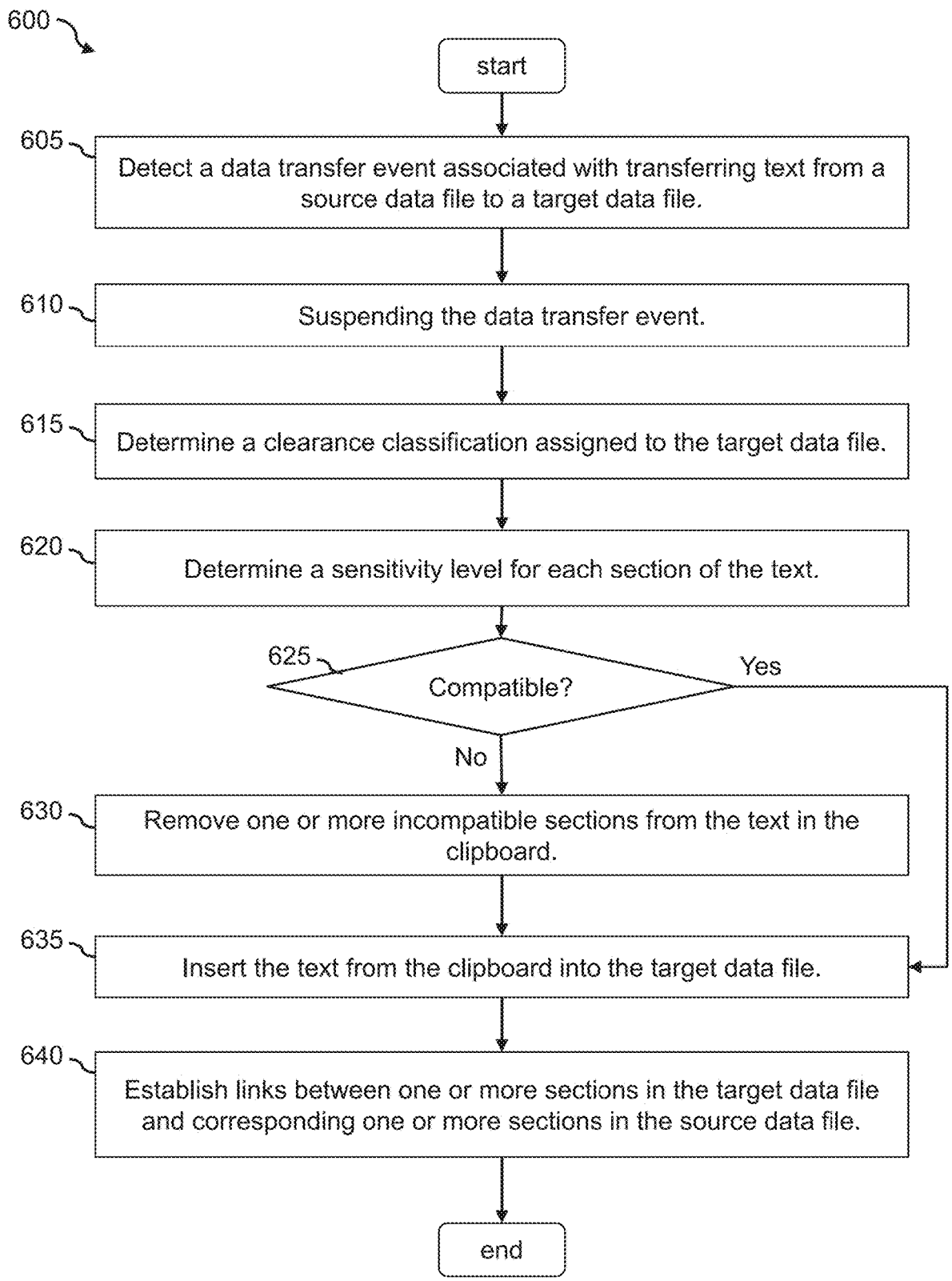
FIG. 6 is a flowchart showing a process of performing dynamic data access control during a transfer of data between two data files according to an embodiment of the present disclosure.

FIG. 6 illustrates a process 600 for performing various data access control functionalities according to various embodiments of the disclosure. In some embodiments, at least a portion of the process 600 may be performed by the data scanning module 132 and/or the event detection module 116. The process 600 begins by detecting (at step 605) a data transfer event associated with transferring text from a source data file to a target data file and suspending (at step 610) the data transfer event. For example, the event detection module 116 may detect that a user of a user device (e.g., the user 140 of the user device 110) has initiated a copy-and-paste operation to copy content from a source data file (e.g., the source data file 402) to a target data file (e.g., the target data file 452), for example, through the operating system of the user device. Upon detecting the initiation of the copy-and-paste operation, the event detection module 116 may suspends (or instruct the operating system of the user device 110 to suspend) the copy-and-paste operation.

The process 600 determines (at step 615) a clearance classification assigned to the target data file and determines (at step 620) a sensitivity level for each section of the text. For example, the event detection module 116 may determine a clearance classification assigned to the target data file 452 (e.g., by accessing the metadata of the target data file 452). The event detection module 116 may also parse through the copied content (e.g., the different sections) of the source data file 402 and determine the sensitivity levels associated with the different sections based on the tags included in the source data file 402.

The process 600 then determines (at step 625) whether the sensitivity levels associated with the sections of the content being copied is compatible with the clearance classification assigned to the target data file. If the sensitivity level of any section of the copied content is not compatible with the clearance classification assigned to the target data file, the process 600 removes (at step 630) one or more incompatible sections from the text in the clipboard. For example, the data scanning module 132 and/or the event detection module 116 may compare the sensitivity levels associated with the copied content against the clearance classification assigned to the target data file 452. If it is determined that a particular section (e.g., the section 416a) of the source data file 402 is not compatible with the clearance classification assigned to the target data file 452, the event detection module 116 may remove the incompatible section (e.g., the section 416a) from a clipboard used by the operating system of the user device 110 to perform the copy-and-paste operation.

When all of the data included in the clipboard is compatible with the clearance classification assigned to the target data file 452, the process 600 inserts (at step 635) the text from the clipboard into the target data file. For example, the event detection module 116 may resume (or instruct the operating system of the user device 110 to resume) the copy-and-paste operation, and insert the text in the clipboard into the target data file 452. The process 600 then establishes (at step 640) links between one or more sections in the target data file and corresponding one or more sections in the source data file. For example, the event detection module 116 may establish links between each section from the source data file 402 (e.g., the sections 412a, 414a, 418a, and 420a) being copied to the target data file 452 to the corresponding sections in the target data file 452 (e.g., the sections 412b, 414b, 418b, and 420b). The links may be used by the event detection module 116 and/or the data scanning module 132 to update the sensitivity levels associated with the sections.

Figure 7:
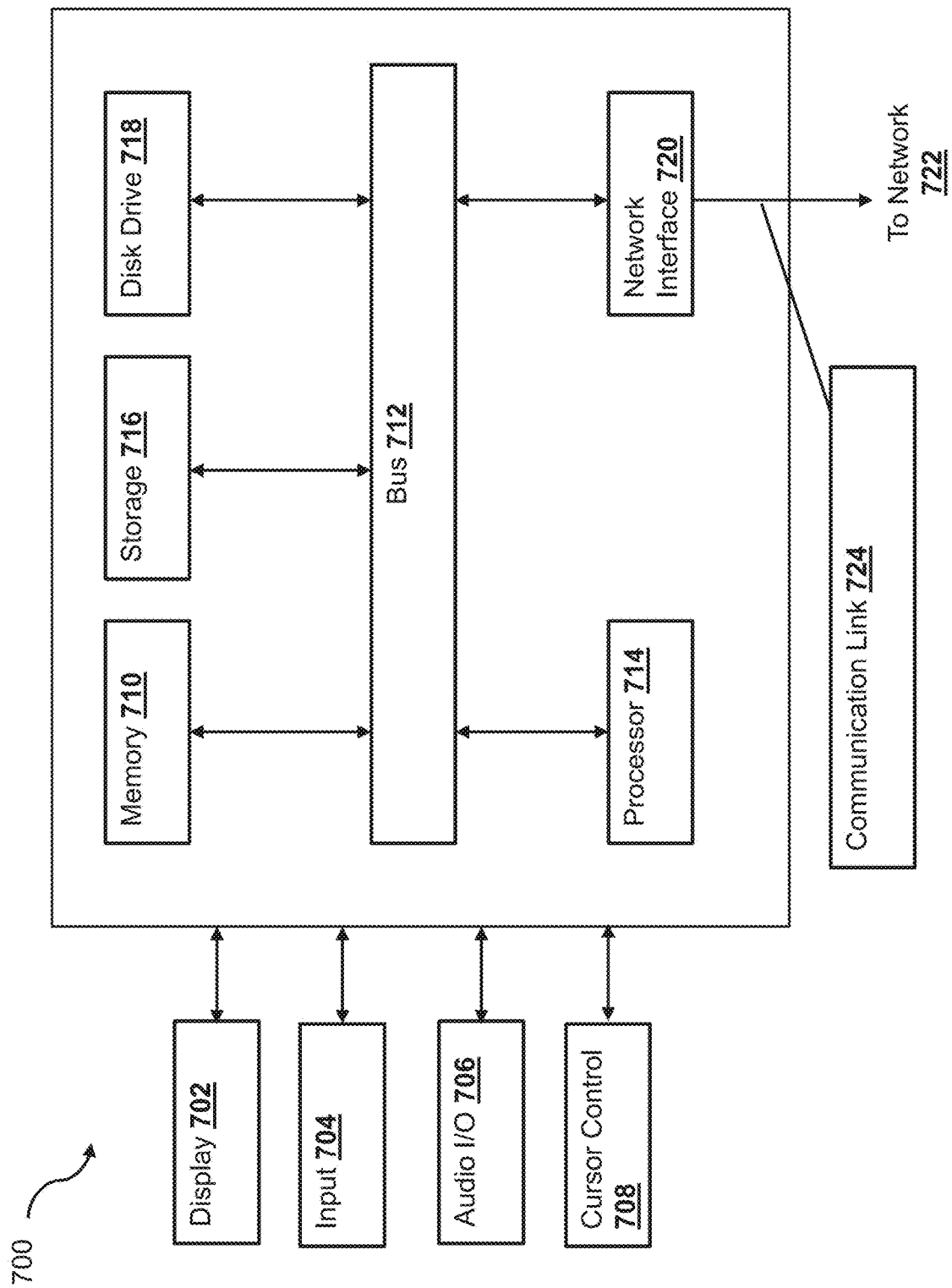
FIG. 7 is a block diagram of a system for implementing a device according to an embodiment of the present disclosure.

FIG. 7 is a block diagram of a computer system 700 suitable for implementing one or more embodiments of the present disclosure, including the service provider server 130, the merchant server 120, and the user devices 110 and 180. In various implementations, each of the user devices 110 and 180 may include a mobile cellular phone, personal computer (PC), laptop, wearable computing device, etc. adapted for wireless communication, and each of the service provider server 130 and the merchant server 120 may include a network computing device, such as a server. Thus, it should be appreciated that the devices 110, 180, 120, and 130 may be implemented as the computer system 700 in a manner as follows.

The computer system 700 includes a bus 712 or other communication mechanism for communicating information data, signals, and information between various components of the computer system 700. The components include an input/output (I/O) component 704 that processes a user (i.e., sender, recipient, service provider) action, such as selecting keys from a keypad/keyboard, selecting one or more buttons or links, etc., and sends a corresponding signal to the bus 712. The I/O component 704 may also include an output component, such as a display 702 and a cursor control 708 (such as a keyboard, keypad, mouse, etc.). The display 702 may be configured to present a login page for logging into a user account or a checkout page for purchasing an item from a merchant. An optional audio input/output component 706 may also be included to allow a user to use voice for inputting information by converting audio signals. The audio I/O component 706 may allow the user to hear audio. A transceiver or network interface 720 transmits and receives signals between the computer system 700 and other devices, such as another user device, a merchant server, or a service provider server via a network 722. In one embodiment, the transmission is wireless, although other transmission mediums and methods may also be suitable. A processor 714, which can be a micro-controller, digital signal processor (DSP), or other processing component, processes these various signals, such as for display on the computer system 700 or transmission to other devices via a communication link 724. The processor 714 may also control transmission of information, such as cookies or IP addresses, to other devices.

The components of the computer system 700 also include a system memory component 710 (e.g., RAM), a static storage component 716 (e.g., ROM), and/or a disk drive 718 (e.g., a solid-state drive, a hard drive). The computer system 700 performs specific operations by the processor 714 and other components by executing one or more sequences of instructions contained in the system memory component 710. For example, the processor 714 can perform the dynamic and modular data classification and access control functionalities described herein, for example, according to the processes 500 and 600.

Logic may be encoded in a computer readable medium, which may refer to any medium that participates in providing instructions to the processor 714 for execution. Such a medium may take many forms, including but not limited to, non-volatile media, volatile media, and transmission media. In various implementations, non-volatile media includes optical or magnetic disks, volatile media includes dynamic memory, such as the system memory component 710, and transmission media includes coaxial cables, copper wire, and fiber optics, including wires that comprise the bus 712. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 700. In various other embodiments of the present disclosure, a plurality of computer systems 700 coupled by the communication link 724 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A method comprising:
   detecting a data transfer event initiated by a user device, wherein the data transfer event is associated with transferring data from a first data file to a second data file;
   determining a particular clearance classification assigned to the second data file;
   detecting, based on traversing the data, a first section of the data having a first sensitivity level that is incompatible with the particular clearance classification assigned to the second data file;
   in response to detecting the first section of the data having the first sensitivity level that is incompatible with the particular clearance classification assigned to the second data file, modifying the data, wherein the modifying the data comprises removing the first section of the data from the data; and
   inserting the modified data as a copied version of the data into the second data file.

2. The method of claim 1, further comprising:
   parsing a plurality of sections of the data in the first data file;
   determining, based on the parsing, a corresponding sensitivity level for each section in the plurality of sections of the data; and
   tagging, within the first data file, each section in the plurality of sections with the corresponding sensitivity level.

3. The method of claim 2, further comprising:
   providing each section of the plurality of sections of the data to a machine-learning model configured to classify the data based on a plurality of sensitivity levels, wherein the corresponding sensitivity level is determined for each section based on an output from the machine-learning model.

4. The method of claim 3, wherein the operations further comprise:
   extracting, from the plurality of sections in the first data file, one or more sections; and
   deriving a subject matter associated with the first data file based on the one or more sections, wherein the determining the corresponding sensitivity level for each section is further based on the subject matter associated with the first data file.

5. The method of claim 4, wherein the one or more sections corresponding to an opening paragraph and a closing paragraph of the first data file.

6. The method of claim 1, further comprising:
   identifying, among a plurality of data files stored in a data repository, a third data file having a portion of text that corresponds to the first section of the first data file; and
   tagging the portion of text in the third data file with the first sensitivity level based on the portion of text in the third data file corresponding to the first section of the first data file.

7. The method of claim 1, further comprising:
   assigning the particular clearance classification to the second data file based on an expected recipient or an expected viewer of the second data file.

8. A non-transitory machine-readable medium having stored thereon machine-readable instructions executable to cause a machine to perform operations comprising:

detecting a data transfer event initiated by a user device, wherein the data transfer event is associated with transferring data from a first data file to a second data file;
determining a particular clearance classification assigned to the second data file;
detecting, based on traversing the data, a first section of the data having a first sensitivity level that is incompatible with the particular clearance classification assigned to the second document;
in response to detecting the first section of the data having the first sensitivity level that is incompatible with the particular clearance classification, modifying the data, wherein the modifying comprises removing the first section of the data; and
inserting the modified data as a copied version of the data into the second data file.

9. The non-transitory machine-readable medium of claim 8, wherein the operations further comprise:
assigning the particular clearance classification to the second data file based on an expected recipient or an expected viewer of the second data file.

10. The non-transitory machine-readable medium of claim 8, wherein the operations further comprise:
establishing links between one or more sections of the modified data included in the second data file and corresponding one or more sections of the data in the first data file.

11. The non-transitory machine-readable medium of claim 10, wherein the operations further comprise:
detecting a change of sensitivity level for a second section of the data included in the first data file;
determining that the second data file includes content corresponding to the second section of the data based on one of the established links; and
updating a sensitivity level associated with the content in the second data file based on the change of the sensitivity level and the one of the established links.

12. The non-transitory machine-readable medium of claim 10, wherein the operations further comprise:
detecting a change of sensitivity level for a second section of the data included in the first data file;
determining that the second data file includes content corresponding to the second section of the data based on one of the established links; and
modifying a clearance classification assignment for the second data file.

13. The non-transitory machine-readable medium of claim 8, wherein the operations further comprise:
parsing a plurality of sections in the first data file;
determining, based on the parsing, a corresponding sensitivity level for each section in the plurality of sections; and
tagging, within the first data file, each section in the plurality of sections with the corresponding sensitivity level.

14. A system, comprising:
a non-transitory memory; and
one or more hardware processors coupled with the non-transitory memory and configured to read instructions from the non-transitory memory to cause the system to perform operations comprising:
detecting a data transfer event initiated by a user device, wherein the data transfer event is associated with transferring content from a first digital document to a second digital document;
determining a particular clearance classification assigned to the second digital document;
detecting, based on traversing the content, a first section of the content having a first sensitivity level that is incompatible with the particular clearance classification assigned to the second document;
in response to detecting the first section of the content having the first sensitivity level that is incompatible with the particular clearance classification assigned to the second document, modifying the content, wherein the modifying the content comprises removing the first section of the content; and
inserting the modified content as a copied version of the content into the second digital document.

15. The system of claim 14, wherein the operations further comprise:
assigning the particular clearance classification to the second digital document based on an expected recipient or an expected viewer of the second digital document.

16. The system of claim 14, wherein the content in the first digital document is a first version of the content, and wherein the operations further comprise:
establishing links between one or more sections of the copied version of the content in the second digital document and corresponding one or more sections of the first version of the content in the first digital document.

17. The system of claim 14, wherein the operations further comprise:
subsequent to the inserting the modified content into the second digital document, detecting a change of sensitivity level for a second section of the first version of the content in the first digital document; and
modifying the second digital document based on the detected change of sensitivity level and a link indicating that the second digital document includes content corresponding to the second section of the first version of the content in the first document.

18. The system of claim 17, wherein the modifying the second digital document comprises removing data corresponding to the second section of the first version of the content from the second digital document.

19. The system of claim 17, wherein the particular clearance classification is a first clearance classification, and wherein the modifying the second digital document comprises re-assigning a second clearance classification to the second digital document.

20. The system of claim 14, wherein the operations further comprise:
subsequent to the inserting the modified content into the second digital document, detecting a change of sensitivity level for the first section of the first version of the content in the first document; and
inserting data corresponding to the first section of the first version of the text into the second digital document based on the detected change of sensitivity level.

* * * * *